United States Patent [19]

Brockmüller et al.

[11] Patent Number: 5,009,525
[45] Date of Patent: Apr. 23, 1991

[54] ROLLER SEATING

[75] Inventors: Uwe Brockmüller, Oberwerrn; Hans-Gerd Weber, Poppenhausen, both of Fed. Rep. of Germany

[73] Assignee: SKF GmbH, Schweinfurt, Fed. Rep. of Germany

[21] Appl. No.: 440,091

[22] Filed: Nov. 22, 1989

[30] Foreign Application Priority Data

Dec. 10, 1988 [DE] Fed. Rep. of Germany ....... 3841629

[51] Int. Cl.$^5$ .............................................. F16C 33/49
[52] U.S. Cl. ..................................... 384/576; 384/580
[58] Field of Search ............... 384/572, 576, 526, 580, 384/531

[56] References Cited

U.S. PATENT DOCUMENTS 3,477,773 11/1969 Alton ................................... 384/576
4,523,862 6/1985 Yasui et al. ........................... 384/572
4,620,806 11/1986 Rabe .................................... 384/572

FOREIGN PATENT DOCUMENTS 2739367 10/1978 Fed. Rep. of Germany .

Primary Examiner—Lenard A. Footland

[57] ABSTRACT

A roller seating for swivel motions includes an outer ring, an inner ring and roller rolling in between which are inserted individually between spacers of a flectionally elastic cage. On at least one end of the spacers, one or more projections directed radially outward and/or radially inward have been formed which face, radially and/or axially, a revolving shoulder surface of the outer ring or the inner ring. In order to keep the play of the rollers between the spacers on the circumferential side as small as desired, each projection of the cage is arranged in such manner that it pushes against the circumference of the corresponding shoulder surface of the outer ring or the inner ring and brings the holding surfaces of the spacers against the rollers due to the elastic deformation of the cage.

11 Claims, 7 Drawing Sheets

ROLLER SEATING

BACKGROUND OF THE INVENTION

The invention relates to bearings and particularly to roller seatings in a roller bearing.

In known roller seating arrangements, for example West German Patent DE-OS 2 739 367 rollers are incorporated between the spacers of a cage with some pocket play so that the rollers can be at an angle in their pocket. During back-and-forth swivel motions of the roller seating the pocket play must be kept as small as possible in a circumferential direction, so that during alternate rolling motions the rollers do not become offset and result in damaging impacts against the spacers. However, in known roller seating arrangements it is not possible to make the tolerance between the spacers and the rollers small enough due to inevitable manufacturing tolerances.

It is therefore the principal object of the invention to provide a roller seating in which the play between spacers on the circumferential side can be kept as small as desired, while complying with the normal manufacturing tolerances for cages and rollers.

SUMMARY OF THE INVENTION

With the bearing seating according to the invention it is possible, during the incorporation or the assembly of the outer ring, the inner ring and the corresponding rolling elements, to load the cage with an axial and/or radial pre-tensioning force which will slightly flex the cage elastically concentrically around its circumference, so that its holding surface rests against the rolling surface of the rolling elements.

In this manner the holding surfaces of the spacers can be maintained at a very tight distance from the roller surfaces of the rollers facing them. The holding surfaces of the spacers can even be made to slide over the roller surfaces through pretensioning. The roller seating according to the invention is therefore particularly suitable for applications in which back-and-forth swivel motions of the roller seating are carried out, whereby the rollers must leave proportionally little play between the spacers of the cage.

A further embodiment provides for a radial outward projection of the cages loaded by an essentially axial pretensioning force which is absorbed by a large diameter of the shoulder surface of the outer ring, while the radial inward projection of the cage absorbs a somewhat equal but opposite axial pre-tensioning force which affects a small diameter of the shoulder surface of the inner ring. This way, the ends of the cage carrying the projections are loaded over its circumference by a bending moment which attempts to flex the cage over its circumference and, in doing so, deforms it elastically. During this deformation the spacers of the cage are tilted radially inward or radially outward, so that each holding surface of the spacers will rest at least in part against the rolling surfaces of the roller facing it.

An additional embodiment provides for the spacers of the cage made relatively flex-proof because the tilting of the spacers in a radial direction is caused only by a deformation of the relevant end of the cage, i.e., the end carrying the projections.

In another embodiment, the pre-tensioning forces affecting the projection or projections on the cage will flex the cage over its full longitudinal section. Accordingly, the cage may be equipped with pockets which enclose the rollers.

A further embodiment provides that each roller of the cage is guided by holding surfaces which partially surround the roller surfaces of each roller radially from the outside or radially from the inside.

A further embodiment provides that one side of the cage has at least one projection directed radially outward which slides on a shoulder surface directed axially inward or outward, of the outer ring, and on the other side the cage has at least one projection directed radially inward which slides on a shoulder surface, also directed axially inward or outward, of the inner ring.

A further embodiment provides that each spacer of the cage, has holding surfaces on a section adjacent to the projection(s) directed radially outward, which surround a roller surface of the roller either radially from the outside or radially from the inside, and holding surfaces on a section adjacent to one of the projections directed radially inward, which surround the roller surface in the opposite direction either radially from the inside or radially from the outside.

A further embodiment provides that the outer ring and/or the inner ring have a cylindrical outer or inner race for the rollers and the outer ring is arranged so it can be axially adjusted relative to the accompanying inner ring.

A further embodiment provide that the projection(s) directed radially inward and/or the projection(s) directed radially outward of the cage is (are) ring-shaped.

BRIEF DESCRIPTION OF THE DRAWINGS

The roller seating according to the invention is further explained in the following description of preferred and alternative embodiments which are shown in the drawing, wherein.

DETAILED DESCRIPTION OF THE INVENTION

Figure 1:
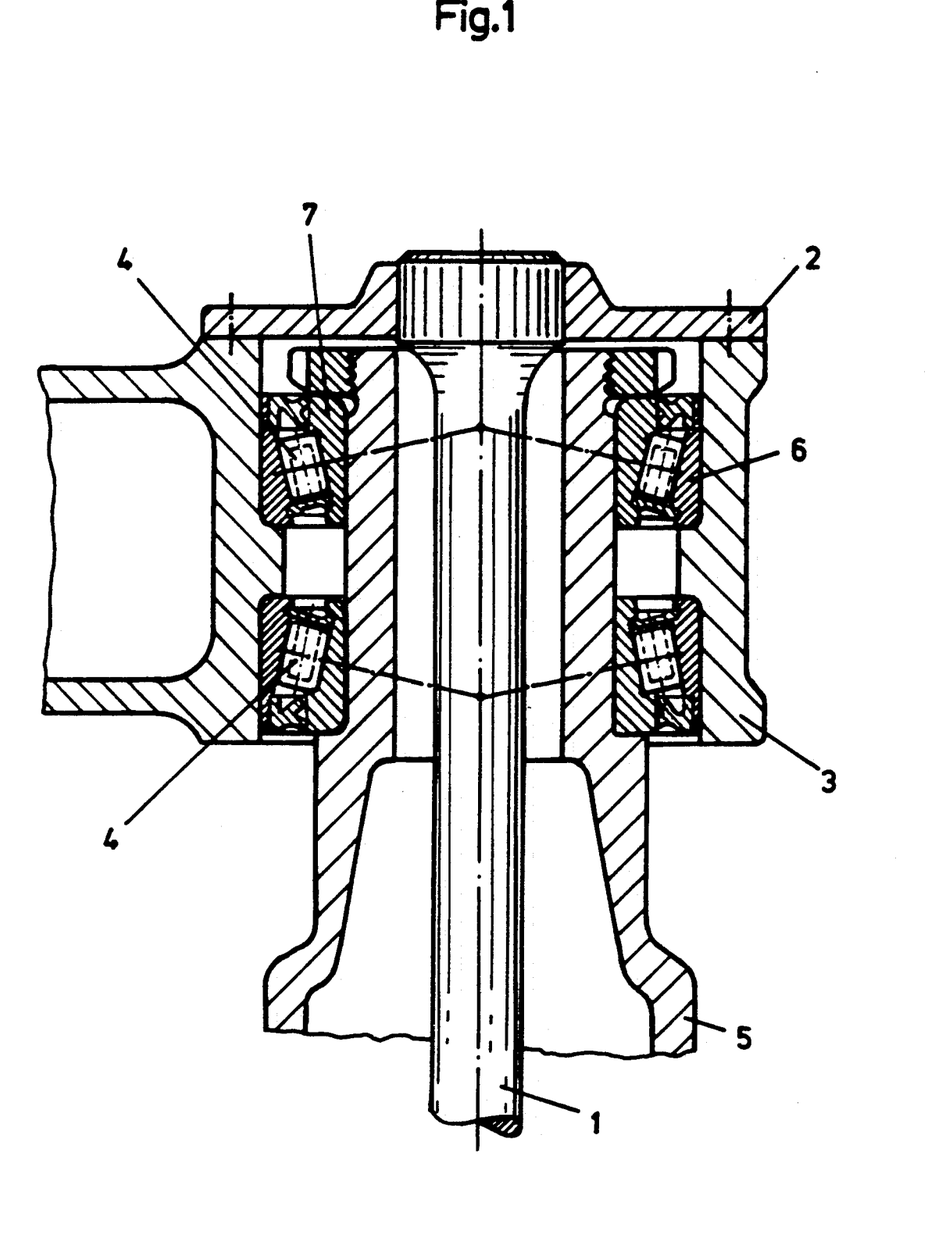
FIG. 1 shows a longitudinal section through two roller seatings built-in the bore of a swivel arm.

The number 1 in FIG. 1 refers to a torque rod of a truck wheel suspension (not shown). One end of the torque rod 1 is attached, rotation-proof, via a cover 2 to a swivel arm 3. The swivel arm 3 has a housing bore in which two identical roller seatings 4 are incorporated which carry and support swivel arm 3 with bearings so it can move and rotate on a sleeve shaft 5.

Figure 2:
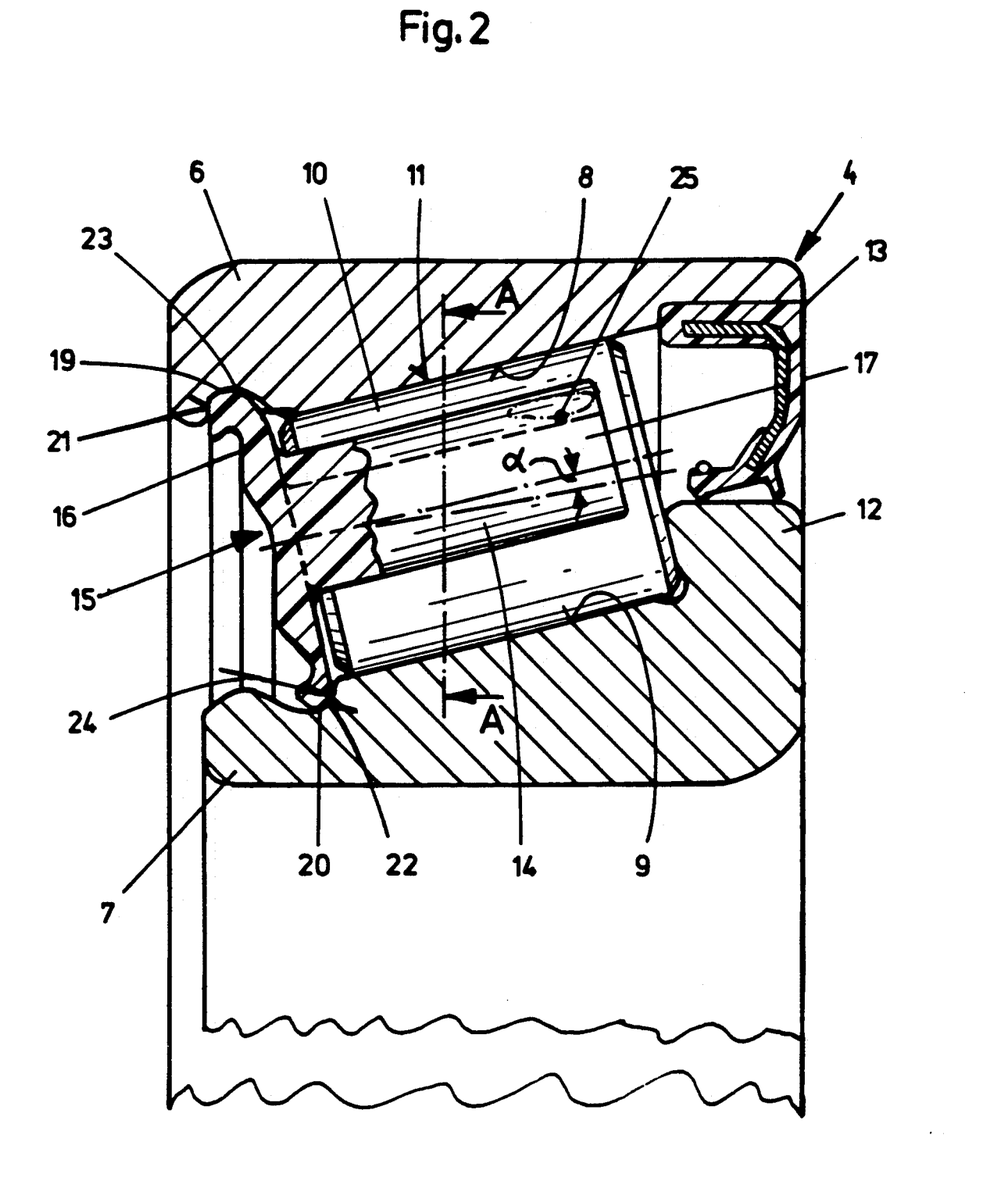
FIG. 2 shows a partial longitudinal section through one of the two roller seatings shown in FIG. 1.

The lines of action of the load in the rolling contacts of the two roller seatings 4 run radially inward and away from each other. Each roller seating 4 has an outer ring 6 installed in the housing bore of the swivel arm 3 and an inner ring 7 installed on the sleeve shaft 5. Between a tapering outer race 8, of the outer ring 6 and a tapering inner race 9 of the inner ring 7 are running rollers 10 having a cylindrical roller surface 11. At the thick end of the inner ring 7 a guiding rim 12 has been formed. The front sides of rollers 10 are guided in a sliding motion along this guiding rim 12 (FIG. 2).

The bore of the outer ring 6 contains a sealing ring 13 whose sealing lips slide along an outer diameter surface 12A of the guiding rim 12.

Each roller 10 is built in between two spacers 14—adjacent at the circumference and extending axially—of a cage 15. Cage 15 consists of an elastic synthetic material made by injection molding. At the left-hand side—see FIG. 2—it has a lateral ring 16 connected so as to form one piece with the relevant end of the joint spacer 14. At the right-hand side the spacers 14 have free ends 17.

Figure 3:
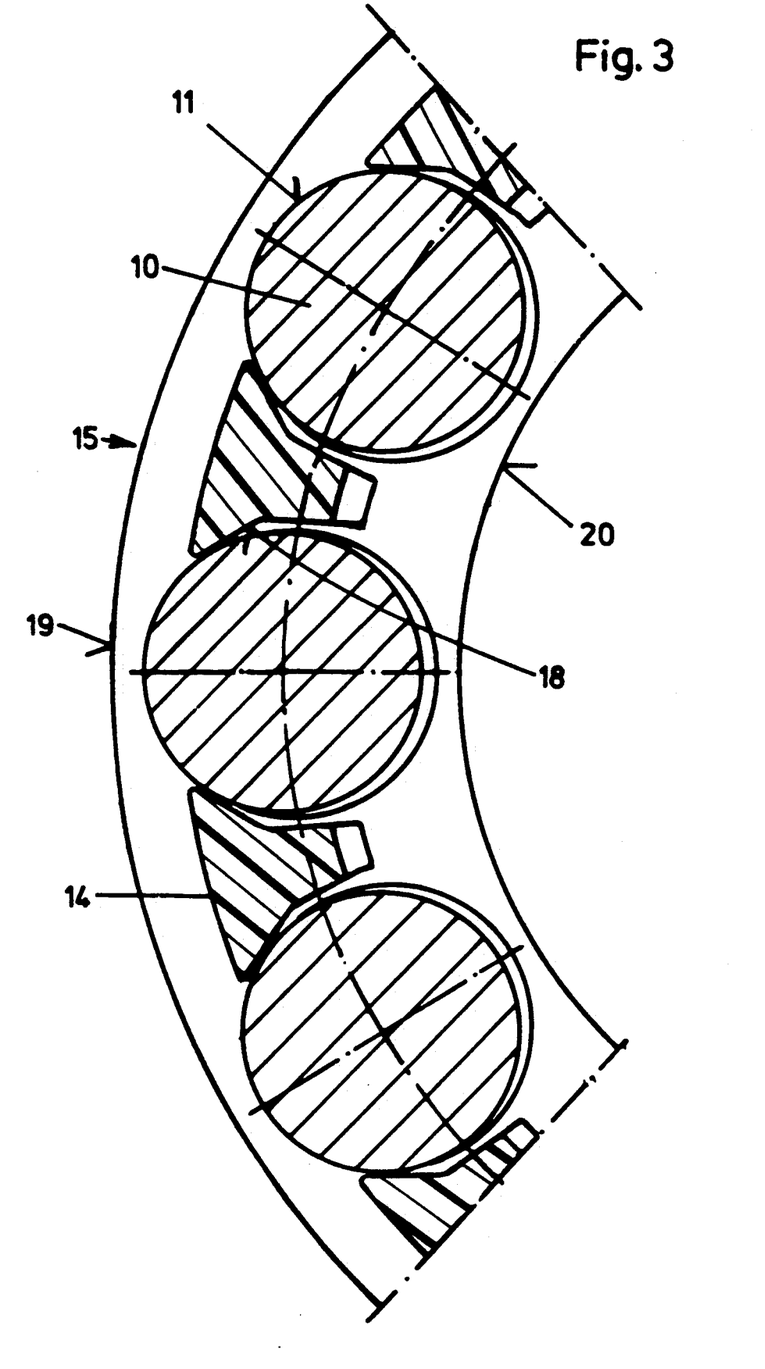
FIG. 3 shows a partial longitudinal section along the line A—A in FIG. 2 through the cage complete with rollers.

The spacers 14 are T-shaped in cross-section so that they present a holding surface 18 on each of their two circumferential sides, the holding surfaces 18 radially surround in part the outside of the roller surface 11 of the roller 10 facing them (FIG. 3).

On its outer edge the lateral ring 16 has a radial outward projection 19 and at its inner edge a radial inward projection 20. Both projections 19, 20 are annular in shape in the present example of execution.

The projection 19 slides on a revolving, axially inward projecting shoulder surface 21 of the outer ring 6 and the projection 20 on a revolving, axially outward projecting shoulder surface 22 of the inner ring 7.

In this arrangement the outer projection 19 pushes essentially axially outward with a linear pre-tensioning force 23 affecting a large circle, while the inner projection 20 pushes axially inward with a pre-tensioning linear force 24 affecting a small circle (FIG. 2). Because the projections 19, 20, together with the corresponding lateral ring 16 are designed to be elastic, they are elastically deformed by the pre-tensioning forces 23 and 24 so that the spacers 14 are turned over the angle alpha. At the same time, the holding surfaces 18 of the spacers 14 rest against the adjacent roller surface 11 so that they touch the roller surface 11 in the vicinity of their free ends 17 at a contact surface 25 (FIG. 2).

Figure 4:
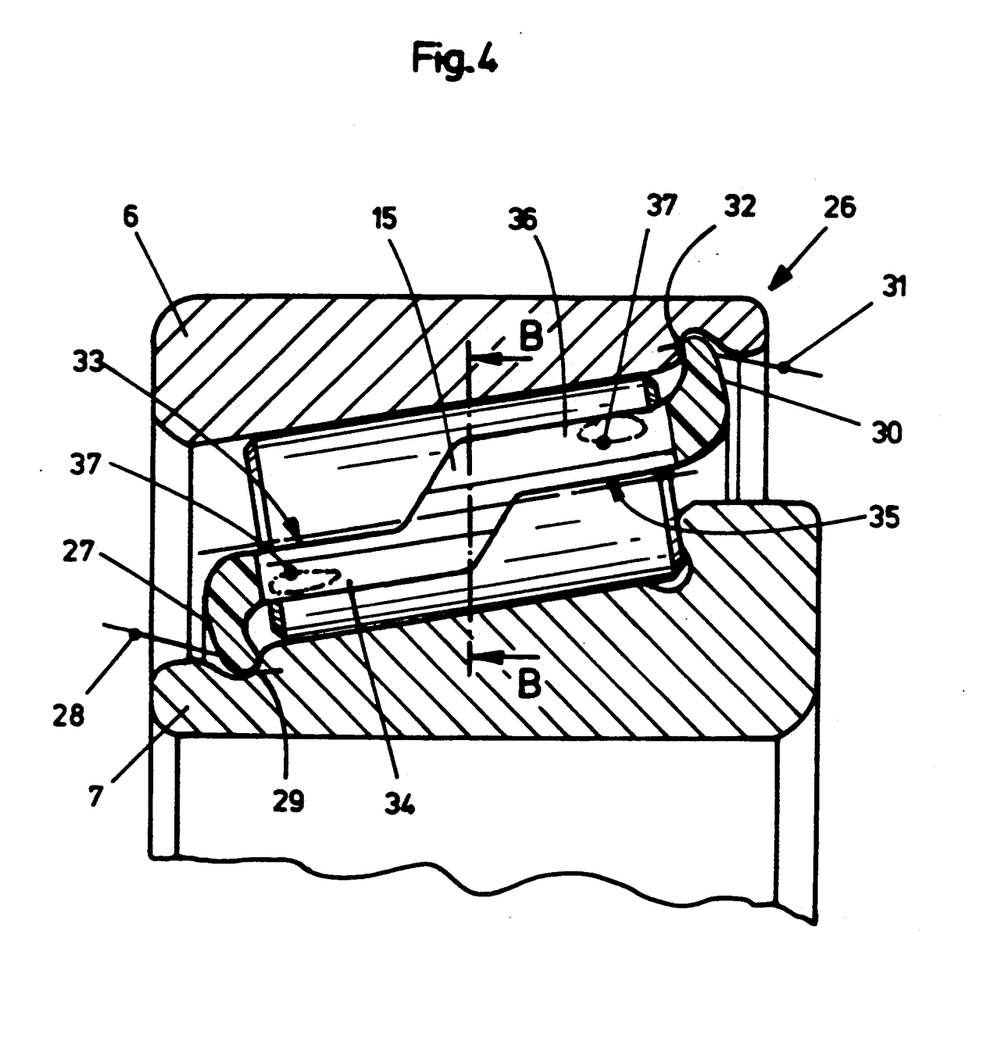
FIG. 4 shows a partial longitudinal section through a modified roller seating.

FIG. 4 shows a modified roller seating 26 whose cage 15 has, on its side to the left in the drawing, an annular projection 27 extending radially inward, which pushes through an essentially axially directed pre-tensioning force 28 against an axially outward facing shoulder surface 29 of the inner ring 7 and, during operation, slides over this shoulder surface 29 in the direction of the circumference. In addition, the cage 15 has on its right-hand side an annular projection 30 extending radially outward. This outer projection 30 pushes with an essentially axially directed pre-tensioning force 31 against an axially outward facing shoulder surface 32 of the outer ring 6. At both their ends, the spacers 14 are connected, so as to form one piece, with an annular projection 27 or 30.

Figure 5:
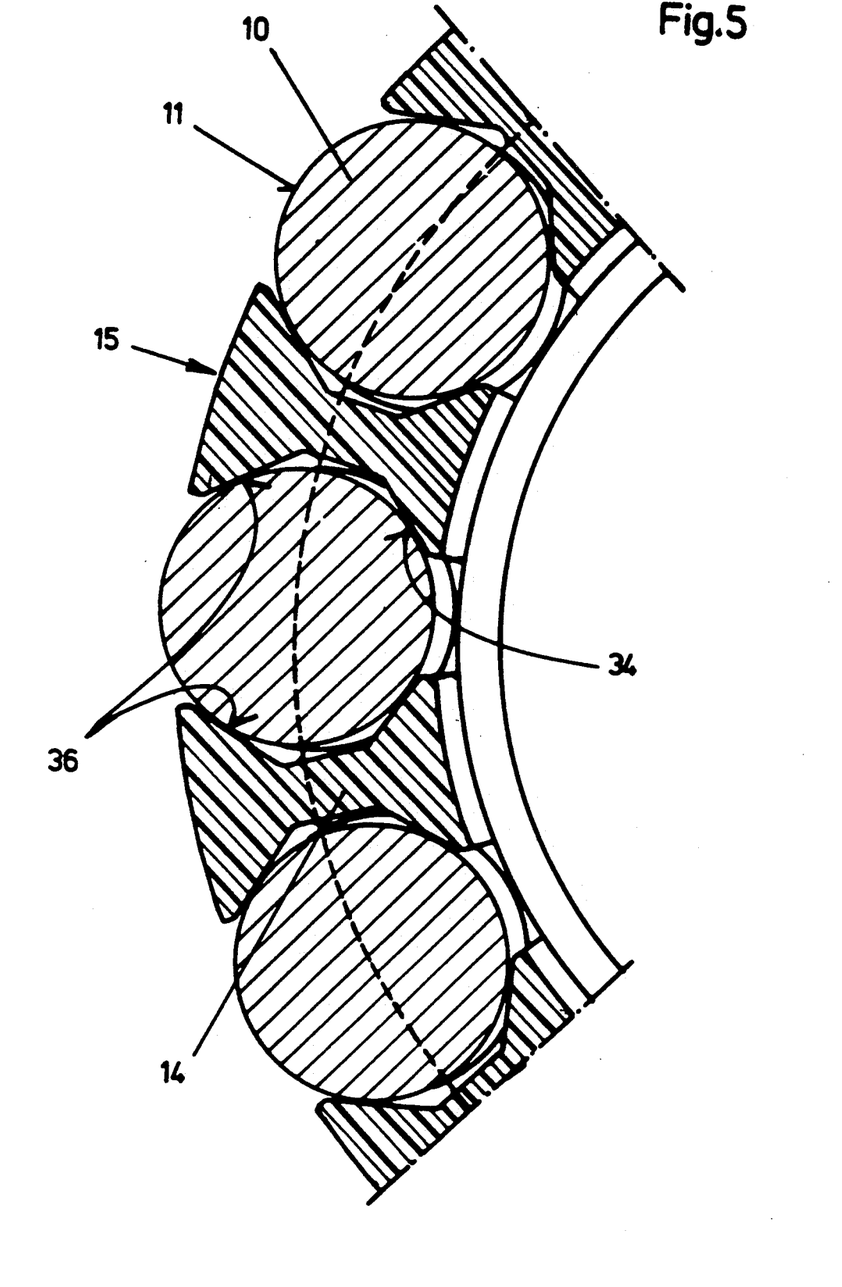
FIG. 5, shows a partial cross-section along the line B—B in FIG. 4 through the cage complete with rollers.

From the drawings in FIGS. 4 and 5 one can see that each spacer 14 has holding surfaces 34 on a section 33 adjacent to the projection 27 extending radially inward, which holding surfaces surround the roller surface 11 of a roller 10 radially from the inside. In addition, each spacer 14 has holding surfaces 36 on a section 35 adjacent to the projection 30 extending radially outward, which holding surfaces surround the roller surface 10 radially from the outside.

The cage 15 is built in such manner that it will flex elastically at its side sections carrying the projections 27, 30, and also at its spacers 14.

When the roller seating is assembled or when the roller seating is incorporated in a housing or similar (not shown), the two elastic pre-tensioning forces 28 and 31 are generated on the corresponding shoulder surfaces 29 and 32. In the process, the holding surfaces 34, 36 of the spacers 14 are slightly radially displaced, and the holding surfaces 34, 36, will come into contact, at the contact surface 37, with the roller surface 11 of the roller 10 facing them.

Figure 6:
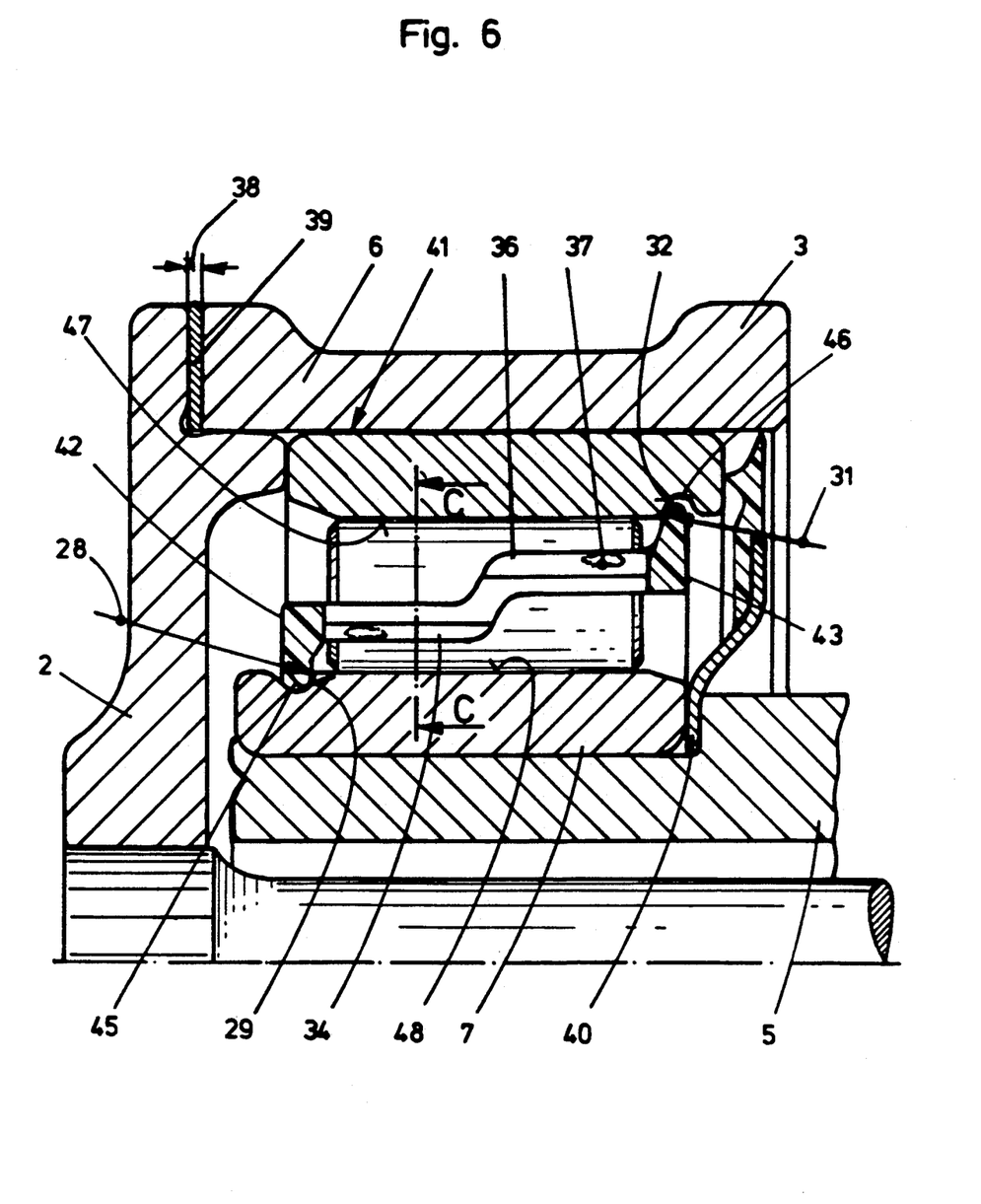
FIG. 6 shows a partial longitudinal section through a further modified roller seating.

FIG. 6 shows a further modified roller seating which forms part of a spring system with a torque rod 1, cover 2 and a swivel arm 3. Between the cover 2 and the swivel arm 3, disks 39 calibrated for thickness 38 have been inserted. A roller seating 41 is incorporated in a housing bore of the swivel arm 3. The roller seating possesses an outer ring 6, an inner ring 7 and, in between these rings, rollers 10 with cylindrical roller surfaces 11. A sealing disk 40 is pinched between the inner ring 7 and a shoulder of a sleeve shaft 5.

The roller seating 41 has a cage 15 with lateral sections 42, 43 on which the spacers 14 have been formed. Each spacer 14 carries at both its circumferential sides a holding section 34 or 36.

Figure 7:
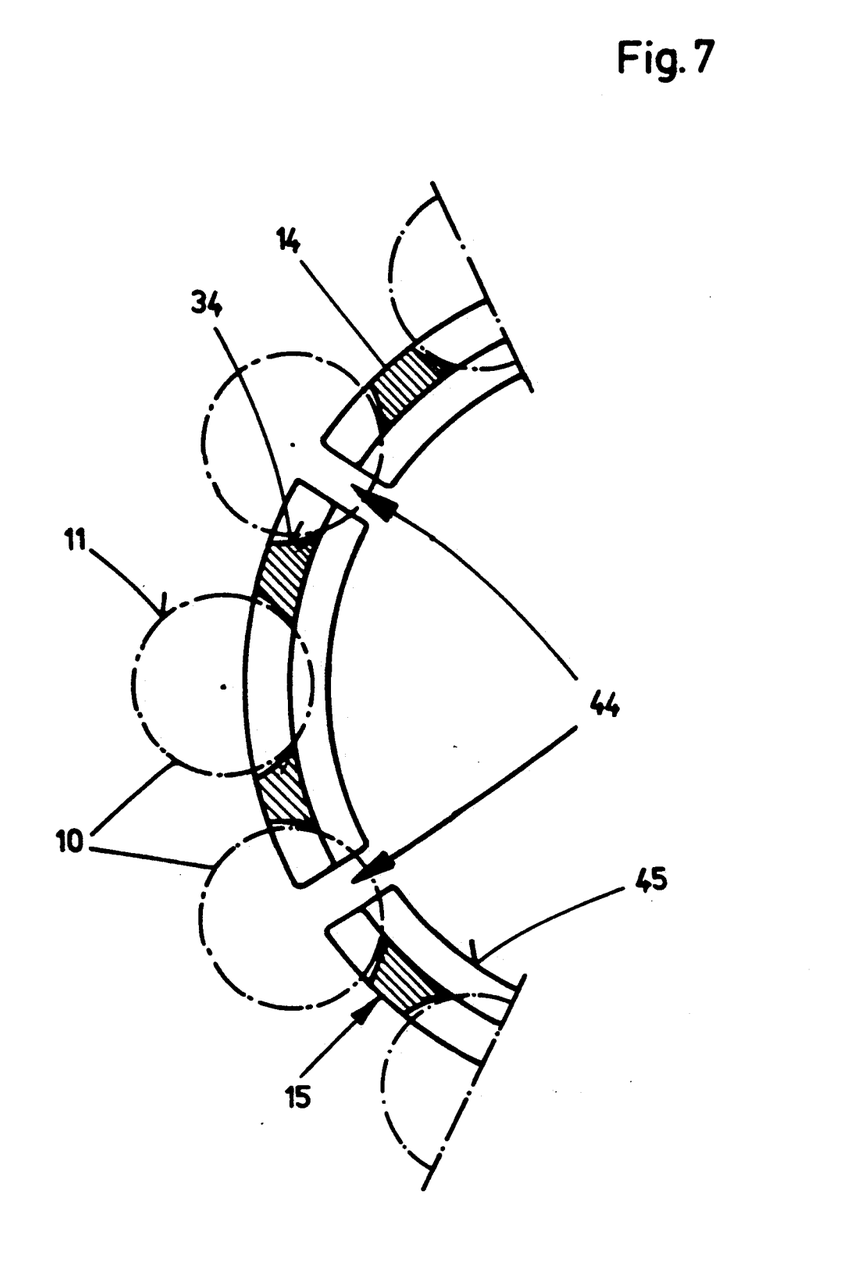
FIG. 7 shows a partial cross-section along the line C—C in FIG. 6 through the cage complete with rollers.

In the case under consideration both lateral sections 42, 43 have, equally distributed over their circumference, continuous radially extending slots 44 (FIG. 7). These slots 44 are arranged so they alternately open up at one side and then the opposite side of a cage pocket. Through these slots 44, projections 45 directed radially inward and uniformly distributed over the circumference—shown to the left in the drawing—are formed, as are projections 46 directed radially outward, shown on the right-hand side of cage 15 in the drawing (FIG. 6). The outer race 47 of the outer ring 6 and the inner race 48 of the inner ring 7 are cylindrical throughout.

When the roller seating 41 is formed in the swivel arm 3, the projections 45 are axially pushed against the shoulder surface 29 of the inner ring 7 and the projections 46 are axially pushed against the shoulder surface 32 of the outer ring 6. Again, this generates the two pre-tensioning forces 28 and 31 which deform the cage 15 elastically. However, in this case the pre-tensioning forces act along circle-segment-shaped contact lines 37 of the projections 45 or 46, which are separated at the circumference from each other by the slots 44.

With regard to the accompanying inner ring 7, the outer ring 6 can be adjusted in an axial direction by means of the calibrated disks 39. With disks 39 of suitable thickness 38, the size of the pre-tensioning forces 28, 31, and the corresponding radial dislocations of the holding surfaces 34, 36 of the spacers 14 of cage 15 can be adjusted.

The examples of execution described above can be structurally modified within the framework of the invention. In order to create greater flexional elasticity in sections of the cage, the lateral section or the lateral ring of the cage may contain axial or radial slots distributed uniformly over the circumference, which slots do not extend through the lateral section or the lateral ring.

In addition, the roller surface of the rollers can be shaped as desired. Thus, the roller surface may be tapered or convex, provided the inner race of the inner ring and the outer race of the outer ring are shaped accordingly. In a roller seating with an outer ring adjustable in an axial direction, only the outer race, or only the inner race, must be cylindrical, while the corresponding inner or outer race may have an different, e.g., tapered, shape.

Finally, the cage does not have to be designed as a closed ring. Indeed, it may be divided by at least one longitudinal cut going all the way through into loose cage segments which extend in the shape of ring sections, or in a straight line.

Other modifications, variations, substitutions or additions within the spirit and scope of the present invention will be apparent to those skilled in that art; it being intended to limit the scope of the invention only by the appended claims, wherein:

What is claimed is:

1. A bearing seating arrangement comprising an outer ring, an inner ring, a bendable elastic cage and rolling elements between said inner and outer rings and positioned to roll in a circumferential direction, each rolling element being installed between essentially axially extending spacers of said cage, the spacers having holding surfaces partially surrounding the rolling surfaces of the rolling elements, at least one of the two ends of the spacers being solidly attached to at least one radially inward and/or radially outward extending projection of the cage, said projection(s) facing a respective revolving shoulder surface(s) of the inner or outer ring, said projection(s) being mounted to be pushed with a directed pre-tensioning force against the circumference of the respective shoulder surface of one of said inner ring or the outer ring, said pre-tensioning force being in a direction to elastically radially dislocate said holding surfaces against said rolling elements.

2. The seating of claim 1 comprising two of said projections, one at each end of said cage, said pre-tensioning force being axially directed at each of said projections.

3. The seating of claim 1 comprising two of said projections, one at each end of said cage, said pre-tensioning force being radially directed at each of said projections.

4. The seating according to claim 1, wherein said cage has two sides, one of said sides having at least one said projection directed radially outward which slides on an axially directed shoulder surface of said outer ring, said projection on said one side being also directed radially inward and sliding on an opposite shoulder surface of said inner ring, said last mentioned shoulder surface being directed axially.

5. The seating according to claim 4, wherein the spacers of the cage have free ends on sides thereof that are axially away from the projections.

6. The seating according to claim 1, wherein one side of the cage has at least one projection directed radially outward which slides on an axially inward or outward directed shoulder surface of the outer ring, the other side of the cage having at least one projection directed radially inward which slides on an axially inward or axially outward directed shoulder surface of the inner ring.

7. The seating according to claim 6, wherein each spacer of the cage has holding surfaces on a section adjacent to the radially outward directed projection(s), which surround a roller surface of the rolling element either radially from the outside or radially from the inside, and holding surfaces on a section adjacent to one of the radially inward directed projections, which surround the rolling surface in the opposite direction either radially from the inside or radially from the outside.

8. The seating according to claim 6, wherein the outer ring and/or the inner ring have a cylindrical outer or inner race for the rolling elements and the outer ring is arranged so it can be axially adjusted with respect to the accompanying inner ring.

9. The seating according to claim 8, wherein the radially inward and/or radially outward directed projection(s) is ring-shaped.

10. In a bearing seating arrangement for a bearing having inner and outer bearing rings, a cape having axially extending spacers, and rolling elements positioned to roll between said inner and outer rings and be separated by said spacers, the improvement wherein said spacers are bendably elastic and have holding surfaces engaging said rolling elements, and further comprising means for elastically concentrically flexing said cage about its circumference to hold said holding surfaces against said rolling elements.

11. The bearing seating arrangement of claim 10 wherein said means for elastically flexing said cage comprises means projecting from said cage and slidably contacting said inner and outer rings with pretension.

* * * * *